United States Patent [19]

Kumakura et al.

[11] Patent Number: 5,061,057
[45] Date of Patent: Oct. 29, 1991

[54] POROUS CONTACT LENS AND METHOD FOR MAKING IT

[75] Inventors: Minoru Kumakura, Maebashi; Isao Kaetsu, Takatsuki; Yoshihide Komaki, Katsuta; Tsutomu Sakurai, Tokai; Ryuji Arai, Toshima; Yasuji Sejima, Chofu; Takashi Ohno, Ohta; Toshiyuki Itoh; Hideo Kohyama, both of Ohmiya, all of Japan

[73] Assignee: Japan Atomic Energy Research Institute, Toyko, Japan

[21] Appl. No.: 357,320

[22] Filed: May 25, 1989

[30] Foreign Application Priority Data

May 27, 1988 [JP] Japan ................. 63-128181

[51] Int. Cl.$^5$ ................. G02C 7/04
[52] U.S. Cl. ................. 351/160 R; 351/160 H; 351/177
[58] Field of Search ............ 351/160 R, 160 H, 161, 351/162, 177

[56] References Cited

U.S. PATENT DOCUMENTS

| | | | |
|---|---|---|---|
| 3,660,545 | 5/1972 | Wichterle | 264/1 |
| 3,699,089 | 10/1972 | Wichterle | 260/86.1 |
| 3,802,972 | 4/1974 | Fleischer et al. | 351/160 H |
| 4,010,088 | 3/1977 | Okubo et al. | 204/159.24 |
| 4,038,264 | 7/1977 | Rostoker et al. | 260/79.3 M |
| 4,056,496 | 11/1977 | Mancini et al. | 260/29.6 T A |
| 4,068,933 | 1/1978 | Seiderman | 351/160 R |
| 4,138,300 | 2/1979 | Kaetsu et al. | 204/159.22 |
| 4,379,864 | 4/1983 | Gallop et al. | 523/106 |
| 4,388,436 | 6/1983 | Chen | 524/553 |
| 4,411,754 | 10/1983 | Kaetsu et al. | 204/159.15 |
| 4,450,262 | 5/1984 | Drake et al. | 526/234 |
| 4,466,705 | 8/1984 | Michelson | 350/418 |
| 4,495,313 | 1/1985 | Larsen | 523/106 |
| 4,687,806 | 8/1987 | Morris et al. | 524/765 |
| 4,709,996 | 12/1987 | Michelson | 350/418 |
| 4,909,896 | 3/1990 | Ikushima et al. | 351/160 H X |

FOREIGN PATENT DOCUMENTS 1417396 12/1975 United Kingdom .

OTHER PUBLICATIONS

ARCO Specialty Chemicals Chart, 2 pp.

*Primary Examiner*—Scott J. Sugarman
*Attorney, Agent, or Firm*—Christensen, O'Connor, Johnson & Kindness

[57] ABSTRACT

In order to make hard and soft contact lenses having a pore diameter and a pore density optimum for use as oxygen permeable contact lenses, the contact lens after molding is subjected to irradiation of a polyvalent heavy ion beam having a mass number of 2 to 100 (preferably 10 to 80) and an ion energy of 10M eV (preferably 50M eV) or higher, at an ion radiation density of 10 to $10^9$ ions/cm$^2$ (preferably $10_2$ to $10_5$ ions/cm$^2$) and thereafter ultrasonically etched (preferably at 10 to 50 MHz) at a temperature of 4 to 50° C. (preferably 10° to 30° C.) in the presence of chloroacetic acid (preferably tricholoracetic acid).

14 Claims, 1 Drawing Sheet

POROUS CONTACT LENS AND METHOD FOR MAKING IT

TECHNICAL FIELD

The present invention relates to a contact lens and a method for making it and, more particularly, to a contact lens provided with a plurality of pores extending therethrough formed by subjecting the contact lens to irradiation of polyvalent heavy ion beam.

BACKGROUND OF THE INVENTION

In view of the fact that a contact lens generally must allow the cornea to be supplied with oxygen, the soft contact lens usually has been formed from a suitable hydrophilic monomer, such as hydroxyethylmethacrylate, so as to improve the oxygen permeability, while the hard contact lens conventionally has been formed from hydrophobic material of high oxygen permeability or the lens size has been reduced and, in this case, lacrima has been relied for the oxygen supply.

The soft contact lens is certainly advantageous in that, during its use, the resinous material constituting this contact lens is sufficiently swollen with moisture to facilitate the oxygen diffusion and such resinous material of soft type eliminates or reduces a sense of incompatibility, allowing the user to wear the contact lens for a long period. Thus, the contact lens of this type has been widely accepted. However, the contact lens of this type has intrinsic disadvantages with respect to mechanical strength such as tensile strength and tear strength as well as with respect to a correspondingly limited durability. Additionally, the soft contact lens is made of hydrophilic material to which undesired substances such as bacteria or protein readily cling and this necessarily leads to requirement for troublesome periodical treatment of the contact lens, e.g., boiling or sterilizing treatment.

Concerning the hard contact lens, on the other hand, there has recently been available a contact lens utilizing silicone resin having a high oxygen permeability coefficient, but it cannot be expected for such contact lens to effect an adequate oxygen supply to cornea.

Both the soft and hard contact lenses which are presently available have an oxygen permeability coefficient as low as 1 to $10 \times 10^{-11} cm^3 \cdot cm/cm^2 \cdot sec \cdot mmHg$ and, at such level of oxygen permeability, it is impossible for the user to wear the contact lens for a long period. Instead, the user is normally obliged to take his or her contact lens off every day or every few days and to be diagnosed by an ophthalmologist.

Making the contact lens porous in a physical manner already has been attempted by subjecting the contact lens to various kinds of processing, e.g., electrical discharge and laser irradiation, in order to improve the oxygen permeability of the contact lens. However, it has been difficult for such prior art processing to form fine pores each having a sufficiently small diameter in the order of angstroms to pass only gaseous molecules, such as oxygen molecules, therethrough and always resulted in forming pores of 500 $\mu m \phi$ or larger. Furthermore, such prior art processing inconveniently has led to a transparency loss of the resin and resulted in the optical material unsuitable for ophthalmologic application.

It is well known to form porous film used as separating film by subjecting high molecular resin film to irradiation of ion beam and then subjecting this to etching. Because the separating film, in view of the purpose of its use, is not required to be transparent, the etching has usually been performed at a temperature of 180° C. or higher, utilizing strong alkali or strong acid also of a high temperature. Accordingly, the film obtained in this manner is certainly porous but opaque, since the initial transparency of the high molecular resin film has been lost in the course of said processing. The contact lens used for ophthalmologic purpose, on the contary, must be provided with pores each having a diameter within a predetermined range at a pore density also within a predetermined range, without a significant transparency loss. More specifically, each pore must have a size precisely restricted so as to pass only the oxygen molecules therethrough and a pore size in excess of such critical limit might often facilitate protein content of lacrima to be mixed with various bacteria which, in turn, might proliferate and cause eye diseases.

A primary object of the present invention is to provide soft and hard contact lenses which have an oxygen permeability sufficiently improved for continuous wearing for a long period, and which can be easily handled from a hygienic viewpoint, and thereby eliminate the above-mentioned drawbacks encountered by the oxygen permeable contact lenses of well known art.

SUMMARY OF THE INVENTION

The inventors have pursued their studies to achieve the object as set forth above, and discovered that the contact lens after molding may be subjected to irradiation of a polyvalent heavy ion beam to obtain a lens having pore diameter and pore density optimum for use as an oxygen permeable contact lens.

More particularly, the present invention provides a hard contact lens substantially made of methylmethacrylate polymer or a soft contact lens substantially made of hydrophilic resin such as hydroxyalkylmethacrylate polymer, said hard or soft contact lens being made porous by subjecting the contact lens to irradiation of a polyvalent heavy ion beam and, more preferably, by subjecting the contact lens after thus subjected to irradiation of the heavy ion beam further to ultrasonic etching in the presence of chloroacetic acid so as to form a plurality of pores each having an average diameter of 50 to 1000 Å, which are distributed with a pore density of 10 to $10^9$ pores/cm$^2$ and extend through the contact lens without resulting in a transparency loss.

DESCRIPTION OF THE PREFERRED EMBODIMENT

Figure 1:
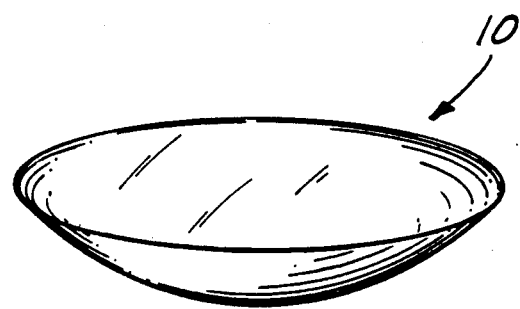
FIG. 1 is a perspective view of a contact lens formed in accordance with the present invention.

The present invention utilizes the heavy ion beam generated by an ion irradiator such as cyclotron or tandem type ion accelerator. Although useful kinds of the heavy ion cover a wide range including helium ion, lithium ion, beryllium ion, oxygen ion, iron ion and iodine ion, all of these being heavier than proton, it is preferable to use the kinds of ion heavier than lithium ion to make the contact lens porous.

Electric charge of heavy ion generally corresponds to monovalent ion and it is possible to generate heavy ion of high energy, for example, pentavalent ion, septavalent ion, etc., corresponding to said monovalent ion having had many electrons taken away. The inventors discovered that, by use of such polyvalent heavy ion beam, it is possible to form pores optimal for the oxygen permeable contact lens.

Mass number of the heavy ion must be selected in accordance with the thickness of the contact lens to be made by being subjected to the ion beam machining, because the mass range of the ion decreases as the mass number of ion increases. Generally, the thickness of the contact lens is 50 $\mu$m or thicker and, therefore, the mass number of the heavy ion can be selected within a range in order of 2 to 100, and preferably within a range from 10 to 80.

Although any desired level of the heavy ion energy can be used by the present invention so long as this energy level is 10M eV or higher, an ion energy of 50M eV or higher is preferable, since it becomes more difficult for the ion to penetrate the contact lens as the thickness of the latter increases.

The density of ion beam irradiation depends on the density of pore formation over the contact lens and, in practice, a range of 10 to $10^9$ ions/cm$^2$ is suitable. Although even a density of 100 Å pore formation as low as 10 pores/cm$^2$ will be adequate for oxygen supply to the cornea, a pore formation density in order of $10^2$ pores/cm$^2$ will be necessary to allow cornea to be supplied not only with oxygen, but also with protein and other substances through these pores of the contact lens. Correspondingly, a density of ion beam irradiation in order of $10^2$ to $10^5$ ions/cm$^2$ will be optimum.

As has been mentioned above, when the contact lens is subjected to irradiation of a polyvalent ion beam having an adequately high kinetic energy, the heavy ion breaks chemical bonds in resinous material of this contact lens and thereby penetrates the latter to form a plurality of fine pores extending therethrough perpendicularly to the lens surface. These pores are defined by rough tracks of ions and must be subjected further to etching treatment in order to obtain well finished pores which are more permeable for oxygen.

It is well known to irradiate a polymer with an ion beam followed by subjecting this polymer to etching treatment. For example, a technique of ion beam machining has already been adopted to achieve pore formation, in which polycarbonate is irradiated with a suitable ion beam and then subjected to etching treatment at a temperature of 50° to 60° C. for approximately 10 hours, utilizing 5 to 6N sodium hydroxide. However, the resultant corrosion of the polymer is not limited to the beam track and necessarily loses its initial transparency, so the product obtained by such technique cannot be used as optical material, but exclusively has been used as material for separation.

Etching treatment of ion beam tracks, without causing excessive corrosion which leads to a significant transparency loss, has been considered impossible unless a dramatically improved or novel technique is developed, and a surprising fact has been found by the inventors that a contact lens having been irradiated with a polyvalent heavy ion beam may be subjected to ultrasonic etching treatment in the presence of chloroacetic acid to obtain a transparent porous contact lens of high oxygen permeability.

As the chloroacetic acid, monochloroacetic acid, dichloroacetic acid or trichloroacetic acid may be used, and particularly trichloroacetic acid is preferable from the viewpoint of reaction efficiency. In general, using such chloroacetic acid in the form of aqueous solution at a concentration of 10 to 40% by weight, the ultrasonic etching is performed at a temperature of 4° to 50° C., preferably at a room temperature of 10° to 30° C. Although a time duration for which the etching treatment is performed depends on a particular type of resin to be treated and other various conditions, a range in order of 1 to 5 hours will be adequate with ultrasonic waves at a frequency of 10 to 50 KHz. It should be understood that such time duration of the etching treatment may be shortened by using strong acid, such as hydrochloric acid, sulfuric acid, perchloric acid or fluoric acid, in addition to chloroacetic acid so far as such additional strong acid does not make the lens opaque.

Figure 2:
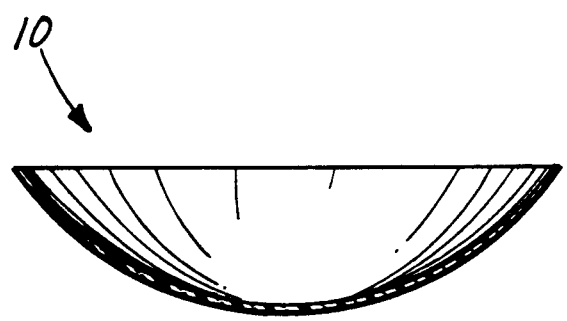
FIG. 2 is a view of a cross-section taken through the lens shown in FIG. 1.

The present invention is applicable to both the hard contact lens and the soft contact lens as identified by reference number 10 in FIGS. 1 and 2. Typical examples of the hard contact lens include that substantially made of methylmethacrylate polymer, and that substantially made of copolymer of methylmethacrylate with siloxanylmethacrylate or fluorine containing compound.

The soft contact lens is substantially made of a hydrophilic monomer which is typically selected from a group consisting of the ester compounds of polydydric alcohol with acrylic acid or methacrylic acid, e.g., hydroxyethylacrylate, hydroxyethylmethacrylate, hydroxypropylacrylate, hydroxypropylmethacrylate, polyethyleneglycolacrylate, polyethyleneglycomethacrylate, polyethylene-glycoldiacrylate, polyethyleneglycoldimethacrylate, methoxypolyethylene-glycolacrylate and methoxypolyethyleneglycolmethacrylate; N-vinylpyrrolidone; copolymers of said ester compounds with N-vinylpyrrolidone; and copolymers of the substances as set forth above with hydrophilic monomers, such as methylmethacrylate, acrylic acid, methacrylic acid, acrylamide, methacrylamide and dimethylacrylamide, or hydrophobic monomers such as (cyclo)alkylacrylate, (cyclo)alkylmethacrylate, allylacrylate, allylmethacrylate, hexandiolacrylate, hexanediolmethacrylate, diethyleneglycoldiacrylate, diethyleneglycolmethacrylate, tetraethyleneglycoldiacrylate and tetraethyleneglycol-dimethacrylate. Polymerization of these substances is normally achieved by using suitable bridging agent, and typical examples of such bridging agent include divinylbenzen, ethyleneglycoldimethacrylate, diethyleneglycoldimethacrylate, triethyleneglycoldimethacrylate, ethleneglycoldiacrylate, diethyleneglycol-diacrylate and triethyleneglycoldiacrylate.

Any particular manner in which desired polymerization is achieved is not critical for both the hard contact lens and the soft contact lens, and various methods of polymerization, such as catalytic polymerization, radiation-induced polymerization and other methods of polymerization, may be employed. Further, the conditions for execution of the present invention are independent from a degree of resin polymerization.

When the present invention is applied to the hard contact lens substantially made of methylmethacrylate polymer, or the soft contact lens substantially made of hydroxyalkylmethacrylate, it is optimum from the viewpoint of oxygen permeability and transparency of the lens to subject the contact lens to irradiation of a polyvalent heavy ion beam having a mass number of 2 to 100 (preferably 10 to 80) and an ion energy of 10M eV (preferably 50M eV) or higher at an ion irradiation density of 10 to $10^9$ ions/cm$^2$ (preferably $10^2$ to $10^5$ ions/cm$^2$), and thereafter to subject this contact lens to ultrasonic etching treatment (preferably at 10 to 50 MHz) at a temperature of 4° to 50° C. (preferably 10° to 30° C.) in the presence of chloroacetic acid (preferably trichloroacetic acid).

The contact lens which is obtainable in accordance with the invention in the manner as has been described hereinabove is so high in its oxygen permeability that the user can have it on continuously for a long period, and the pores extending the contact lens can be formed at an optimum diameter so controlled that any contamination due to bacteria, protein and other factors can be avoided or reduced, and therefore the lens can be easily handled for its hygienic maintenance.

The method according to the invention also, as has been mentioned above, controls both the diameter and the density of the pores so that not only the oxygen permeability can be improved but also the pores which are optimal for prevention of any contamination occurring due to bacteria, protein and other factors can be efficiently formed. Particularly, the etching treatment is performed under a moderate chemical condition using chloroacetic acid approximately at the normal temperature of a room in combination with an accelerated physical condition using ultrasonic waves, and thereby a contact lens is provided which is so improved over the conventional contact lens that the oxygen permeability is very high and the transparency is almost unchangeable before and after said etching treatment.

The present invention will be more apparent from the following description of examples, but it should be understood that the present invention is not limited to these examples.

EXAMPLE 1

A hard contact lens obtained by catalytic polymerization of methylmethacrylate and having a thickness of 140 $\mu$m at its central portion was irradiated with septavalent oxygen ion beam provided from a tandem type ion accelerator for 7 seconds in vacuum. The ion energy was 120M eV and the ion irradiation density was $3 \times 10^5$ ions/cm$^2$. After irradiated, the contact lens was placed within an ultrasonic wave generator (frequency: 28 KHz) containing therein aqueous solution of trichloroacetic acid at a concentration of 25% by weight and subjected to etching for one hour at a temperature of 15° C. The contact lens thus subjected to the etching treatment was adequately washed with water. After dried, the contact lens was found to be transparent and the transparency was substantially the same as before the ion irradiation. The oxygen permeability coefficient of the contact lens thus made porous (diameter 100 to 500 Å) was measured and a value of $16 \times 10^{-8}$ cm$^3$·cm/cm$^2$·sec·mmHg was obtained. A contact lens as a control which had not been subjected to any ion irradiation exhibited the corresponding value of 0 cm$^3$·cm/cm$^2$·sec·mmHg.

EXAMPLE 2

A hard contact lens obtained by catalytic polymerization of methylmethacrylate and having a thickness of 130 $\mu$m at its central portion was irradiated with divalent carbon ion beam provided from a tandem type ion accelerator for 12 seconds in vacuum. The ion energy was 100M eV and the ion irradiation density was $8 \times 10^7$ ions/cm$^2$. After irradiated, the ultrasonic etching was performed in the same manner as in Example 1 but for three hours at a temperature 25° C. using aqueous solution of dichloroacetic acid at a concentration of 20% by weight. The contact lens thus subjected to the etching treatment was found to be transparent and the transparency was substantially the same as before irradiated with the ion beam. Oxygen permeability of this lens was measured and a value of $35 \times 10^{-6}$ cm$^3$·cm/cm$^2$·sec·mmHg was obtained. It should be noted here that a contact lens as a control which had not been subjected to ion irradiation exhibited a corresponding value of 0 cm$^3$·cm/cm$^2$·sec·mmHg.

EXAMPLE 3

A soft contact lens obtained by catalytic polymerization of a monomer composition consisting of hydroxyethylmethacrylate of 80% by weight, hydroxypropylmethacrylate of 18% by weight and ethyleneglycoldimethacrylate of 2% by weight and having a thickness of 145 $\mu$m was irradiated with pentavalent oxygen ion beam provided from a tendem type ion accelerator for 8 seconds in vacuum. The ion energy was 110M eV and the ion irradiation density was $6 \times 10^4$ ions/cm$^2$. After irradiated, the ultrasonic etching was performed for four hours at a temperature of 10° C. using trichloroacetic acid at a concentration of 20% by weight. The contact lens thus subjected to the etching treatment was immersed in water for 16 hours and then washed with water. After washed, the contact lens was found to be transparent and the transparency was substantially the same as before the ion beam irradiation and a value of $24 \times 10^{-8}$ cm$^3$·cm/cm$^2$·sec·mmHg was obtained. A contact lens as a control which had not been subjected to any ion beam irradiation exhibited a corresponding value of $15 \times 10^{-11}$ cm$^3$·cm/cm$^2$·sec·mmHg.

The embodiments of the invention in which an exclusive property or privilege is claimed are defined as follows:

1. A porous contact lens comprising a lens medium having plurality of pores extending therethrough formed by subjecting the contact lens to irradiation of a polyvalent heavy ion beam.

2. A porous contact lens as recited in claim 1, wherein the average diameter of said pores is within the range from 50 to 1000 Å and the density of said pores is within the range from 10 to $10^9$ pores/cm$^2$.

3. A porous contact lens as recited in claim 1 or 2, wherein said contact lens comprises a hard contact lens substantially made of methylmethacrylate polymer.

4. A porous contact lens as recited in claim 1 or 2, wherein said contact lens comprises a soft contact lens substantially made of hydroxyalkylmethacrylate polymer.

5. The porous contact lens as recited in claim 1, wherein the polyvalent heavy ion beam comprises polyvalent heavy ions having a mass number ranging from about 2 to 100.

6. The porous contact lens as recited in claim 1, wherein the lens has a thickness of about 50 micrometers or greater.

7. A method for making a porous contact lens comprising the steps of subjecting the contact lens to irradiation of a polyvalent heavy ion beam to form a plurality of pores extending therethrough and subjecting said contact lens to ultrasonic etching in the presence of acid to finish said plurality of pores.

8. A method for making a porous contact lens as recited in claim 7, wherein the contact lens is subjected to irradiation of a polyvalent heavy ion beam having a mass number of 2 to 100 and an energy of 10M eV or higher at an ion irradiation density of 10 to $10^9$ ions/cm$^2$.

9. A method for making a porous contact lens as recited in claim 7, wherein said acid is a chloroacetic acid.

10. A method for making a porous contact lens as recited in claim 9, wherein said chloroacetic acid is selected from a group consisting of monochloroacetic acid, dichloroacetic acid and trichloroacetic acid.

11. A method for making a porous contact lens as recited in claim 9 or 10, wherein said chloroacetic acid has a concentration of 10 to 40% by weight.

12. A method for making porous contact lens as recited in claim 7, wherein said ultrasonic etching has a frequency of 10 to 50 KHz.

13. A method for making a porous contact lens comprising the steps of subjecting the contact lens to irradiation of a polyvalent heavy ion beam having a mass number of 2 to 100 and an energy of 10M eV or higher at an ion irradiation density of 10 to $10^9$ ions/cm$^2$, and then subjecting said contact lens to ultrasonic etching in the presence of chloroacetic acid at a temperature of 4° to 50° C.

14. A method for making a porous contact lens as recited in claim 13, wherein said ultrasonic etching is performed at a temperature of 10° to 30° C.

* * * * *

UNITED STATES PATENT AND TRADEMARK OFFICE
CERTIFICATE OF CORRECTION

PATENT NO. : 5,061,057
DATED : October 29, 1991
INVENTOR(S) : M. Kumakura et al.

It is certified that error appears in the above-identified patent and that said Letters Patent is hereby corrected as shown below:

Title Page:

| Column | Line | |
|---|---|---|
| [73] Assignee | 2 | after "Tokyo, Japan" insert --; Kabushiki Kaisha Seed, Tokyo, Japan-- |
| 57 Abstract | 9 | "$10^9$ ions/cm$^2$" should be --$10^9$ ions/cm$^2$-- |
| 2 | 9 | "contary" should be --contrary-- |
| 2 | 53 | "cross-section" should be --cross section-- |
| 6 (Claim 1, Line 2) | 38 | after "having" insert --a-- |

Signed and Sealed this

Twenty-third Day of March, 1993

*Attest:*

STEPHEN G. KUNIN

*Attesting Officer*    *Acting Commissioner of Patents and Trademarks*